US009189803B2

(12) United States Patent
Nordstrand et al.

(10) Patent No.: US 9,189,803 B2
(45) Date of Patent: Nov. 17, 2015

(54) SERVER-BASED PRODUCT SUBSTANTIATION WITH LOCAL FILTERING SYSTEM AND METHOD

(71) Applicants: Barry J. Nordstrand, Excelsior, MN (US); Jason Lynn Prigge, Maple Grove, MN (US); James Joseph Smola, Hanover, MN (US)

(72) Inventors: Barry J. Nordstrand, Excelsior, MN (US); Jason Lynn Prigge, Maple Grove, MN (US); James Joseph Smola, Hanover, MN (US)

(73) Assignee: Solutran, Inc., Minneapolis, MN (US)

( * ) Notice: Subject to any disclaimer, the term of this patent is extended or adjusted under 35 U.S.C. 154(b) by 0 days.

(21) Appl. No.: 14/173,360

(22) Filed: Feb. 5, 2014

(65) Prior Publication Data
US 2014/0236693 A1    Aug. 21, 2014

Related U.S. Application Data

(63) Continuation of application No. 13/835,372, filed on Mar. 15, 2013.

(60) Provisional application No. 61/763,462, filed on Feb. 11, 2013.

(51) Int. Cl.
G06Q 30/02 (2012.01)
(52) U.S. Cl.
CPC ........ *G06Q 30/0222* (2013.01); *G06Q 30/0238* (2013.01); *G06Q 30/0259* (2013.01); *G06Q 30/0269* (2013.01)
(58) Field of Classification Search
CPC .................................................. G06Q 30/0238
USPC ........................................................ 705/14.38
See application file for complete search history.

(56) References Cited

U.S. PATENT DOCUMENTS

| | | | |
|---|---|---|---|
| 6,684,195 B1 | 1/2004 | Deaton et al. | |
| 7,877,289 B1 | 1/2011 | Cunningham et al. | |
| 2002/0040321 A1 | 4/2002 | Nicholson | |
| 2002/0049631 A1* | 4/2002 | Williams | 705/14 |
| 2003/0216967 A1 | 11/2003 | Williams | |
| 2004/0054590 A1 | 3/2004 | Redford et al. | |
| 2004/0140361 A1 | 7/2004 | Paul et al. | |
| 2005/0071222 A1* | 3/2005 | Bigus et al. | 705/14 |
| 2006/0113376 A1* | 6/2006 | Reed et al. | 235/379 |
| 2007/0244745 A1 | 10/2007 | Boal | |
| 2008/0097844 A1 | 4/2008 | Hsu et al. | |
| 2010/0094733 A1 | 4/2010 | Shapira et al. | |
| 2012/0150553 A1* | 6/2012 | Wade | 705/2 |
| 2014/0006126 A1 | 1/2014 | Mysen et al. | |

OTHER PUBLICATIONS

Jul. 11, 2014 USPTO Office Action (U.S. Appl. No. 14/173,385).

* cited by examiner

*Primary Examiner* — Namrata (Pinky) Boveja
*Assistant Examiner* — Allan Woodworth, II
(74) *Attorney, Agent, or Firm* — Beck Tylsver Evans PLLC

(57) ABSTRACT

A system and method is presented for product substantiation and promotion redemption. A purchased product list is transmitted from a retail store system to a promotion analysis server along with a user identifier. The promotion analysis server identifies promotions available to the user, and then considers whether the benefits under the promotions are still available to the user. Discounts for available promotions related to the purchased product list are calculated and transmitted to the retail store system for deduction from the transactions. An approved product list can be provided that filters the purchased product list before transmittal. The approved product list can include promotions from a plurality of programs.

7 Claims, 13 Drawing Sheets

| Data Element | Format | Position | Condition | Comments |
|---|---|---|---|---|
| S3 APL Header Record | | | | |
| Record Type | PIC X(1) | 1 | M | "H" – Header, D – Detail, or T - Trailer |
| Record Sequence # | PIC 9(6) | 2-7 | M | Always "000000" |
| APL Version Number | PIC 9(6) | 8-13 | M | 3-digit Julian Date and 3-digit sequence number |
| Process Date-Time | PIC X(12) | 14-25 | M | Format – YYMMDDHHMMSS |
| Total Record Count | PIC X(6) | 26-31 | M | Includes header, detail and trailer records |
| S3 APL Detail Record | | | | |
| Data Element | Format | Position | Condition | Comments |
| Record Type | PIC X(1) | 1 | M | "D" – Detail |
| Record Sequence # | PIC 9(6) | 2-7 | M | Increments by 1 for each product starting at "000001" |
| Program Code | PIC 9(3) | 8-10 | M | Program Codes are embedded in the card (track 2 data) and in the APL where the Program Code identifies a sub-set of products for the specified program. |
| Product Code Data (includes UPC/PLU data) | PIC 9(16) | 11-26 | M | • Product Code Type Indicator, PIC 9(1):<br>  0 – Universal Product Code (UPC) or Price Lookup Code (PLU)<br>  2 – Department - Configurable by retailer<br>• Product Code Value, PIC 9(15) |
| Product Group Code (new) | PIC X(6) | 27-32 | C | The Product Group Code is an alphanumeric value (starting with an alpha character as an identifier) and has a one-to-may relationship to products (UPCs/PLUs) which allows for multiple products to be consolidated into a single product record for discount authorization messaging. Not all products will be assigned a group code. |
| Type Code | PIC X(3) | 33-35 | C | The type code may be any combination of alphanumeric characters, and it only needs to be passed from point-of-sale to the host to support discount authorization processing. Not all products will be assigned a type code. |
| Authorization Type | PIC X(3) | 36-38 | M | Authorization-Type code dictates the substantiation level required for a given Program.<br>  APL – APL Only (standard basket substantiation; auth message not required)<br>  SOL – DEFAULT - Solutran S3 Host (enhanced substantiation) |
| Settlement Code | PIC X(3) | 39-41 | M | The Settlement Code dictates the appropriate settlement channel by Program ID.<br>  TPS – Third Party Settlement (pre-paid)<br>  SOL – DEFAULT - Solutran (Solutran managed settlement)<br>Online messaging rules may vary depending upon Auth-Type and Settlement Code. |
| Reserved for Future Use | PIC X(40) | 42-81 | M | Reserved for future use... |
| S3 APL Trailer Record | | | | |
| Data Element | Format | Position | Condition | Comments |
| Record Type | PIC X(1) | 1 | M | "T" - Trailer |
| Total Record Count | PIC 9(6) | 2-7 | M | Includes header, detail and trailer records |

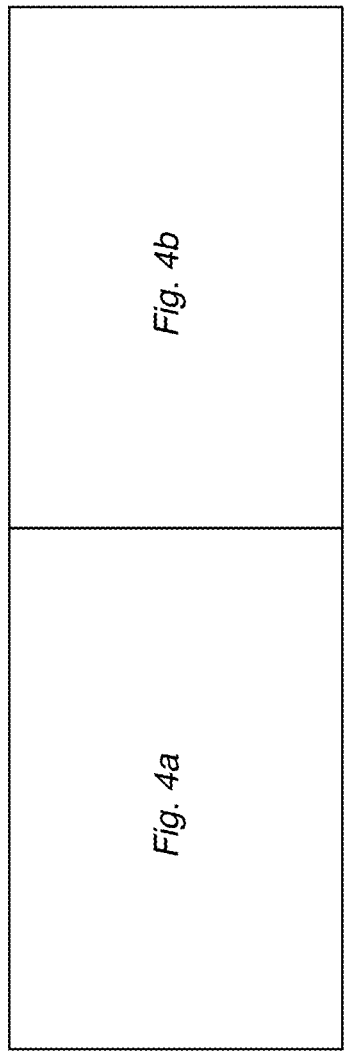

*Fig. 11*

| # | Scenario | Discount Type | Variation | Value | Level | NTE | PR Type | Value | Duration | Benefit | Value | Duration | Primary | Secondary |
|---|---|---|---|---|---|---|---|---|---|---|---|---|---|---|
| 1 | Save $1 on This | Cents Off | 1-for-1 | $1.00 | Promotion | null | Units | 1 | Transaction | Units | 1 | Transaction | This | null |
| 2 | 25 Cent Discount on This - limit 3 | Cents Off | Multiples | $0.25 | Promotion | null | Units | 1 | Transaction | Units | 3 | Transaction | This | null |
| 3 | Buy This x3 - Save 75 Cents | Cents Off | Conditional | $0.75 | Promotion | null | Units | 3 | Transaction | Units | 1 | Transaction | This | That |
| 4 | Buy This to Save $1 on That | Cents Off | Crossover | $1.00 | Promotion | null | Units | 1 | Transaction | Units | 1 | Transaction | This | null |
| 5 | Spend $10 on This Save $1 | Cents Off | Conditional | $1.00 | Promotion | null | Dollars | $10.00 | Transaction | Dollars | $20.00 | Transaction | This | null |
| 6 | $20 Cash Value to Spend on These | Percent Off | Multiples | 100% | Promotion | null | Units | 1 | Transaction | Units | 1 | Transaction | These | null |
| 7 | 10% Discount (max $3) | Percent Off | 1-for-1 | 10% | Promotion | $3.00 | Units | 1 | Transaction | Units | 1 | Transaction | This | null |
| 8 | 10% Discount up to 3 items (max $3) | Percent Off | Multiples | 10% | Promotion | $3.00 | Units | 1 | Transaction | Units | 3 | Transaction | This | null |
| 9 | Free Item up to $20 | Percent Off | 1-for-1 | 100% | Promotion | $20.00 | Units | 1 | Transaction | Units | 1 | Transaction | This | null |
| 10 | BOGO up to $5 | Percent Off | Conditional | 100% | Promotion | $5.00 | Units | 2 | Transaction | Units | 1 | Transaction | This | null |
| 11 | Double BOGO - Limit 2 | Percent Off | Conditional | 100% | Promotion | null | Units | 2 | Transaction | Units | 2 | Transaction | These | null |
| 12 | Buy This - Get That Free up to $5 | Percent Off | Crossover | 100% | Promotion | $5.00 | Units | 1 | Transaction | Units | 1 | Transaction | This | That |
| 13 | 25% Off PPV up to $20/week | Percent Off | Conditional | 25% | Promotion | null | Units | 1 | Transaction | Dollars | $20.00 | Period | This | null |
| 14 | Spend $100 on These - Get That Free ($5) | Percent Off | Conditional | 100% | Promotion | $5.00 | Dollars | $100.00 | Transaction | Units | 1 | Transaction | These | That |
| 15 | $30 Prescription for $20 (max $30) | Percent Off | Copay | 100% | Promotion | $30.00 | Dollars | $20.00 | Transaction | Units | 1 | Transaction | This | null |

SERVER-BASED PRODUCT SUBSTANTIATION WITH LOCAL FILTERING SYSTEM AND METHOD

RELATED APPLICATION

This application is a continuation of U.S. patent application Ser. No. 13/835,372, filed Mar. 15, 2013, which in turn claimed the benefit of Provisional Application No. 61/763,462, filed Feb. 11, 2013, both of which are hereby incorporated in their entireties.

FIELD OF INVENTION

The present application relates to the field of product promotions. More particularly, the described embodiments relate to a system and method for substantiated product purchases made during promotion redemption using a remote server and an approved product list.

BRIEF DESCRIPTION OF THE DRAWINGS

FIG. 3 is a table showing the components of an approved product list.

FIG. 11 is a table showing the components of one embodiment of a promotion.

DETAILED DESCRIPTION

Figure 1:
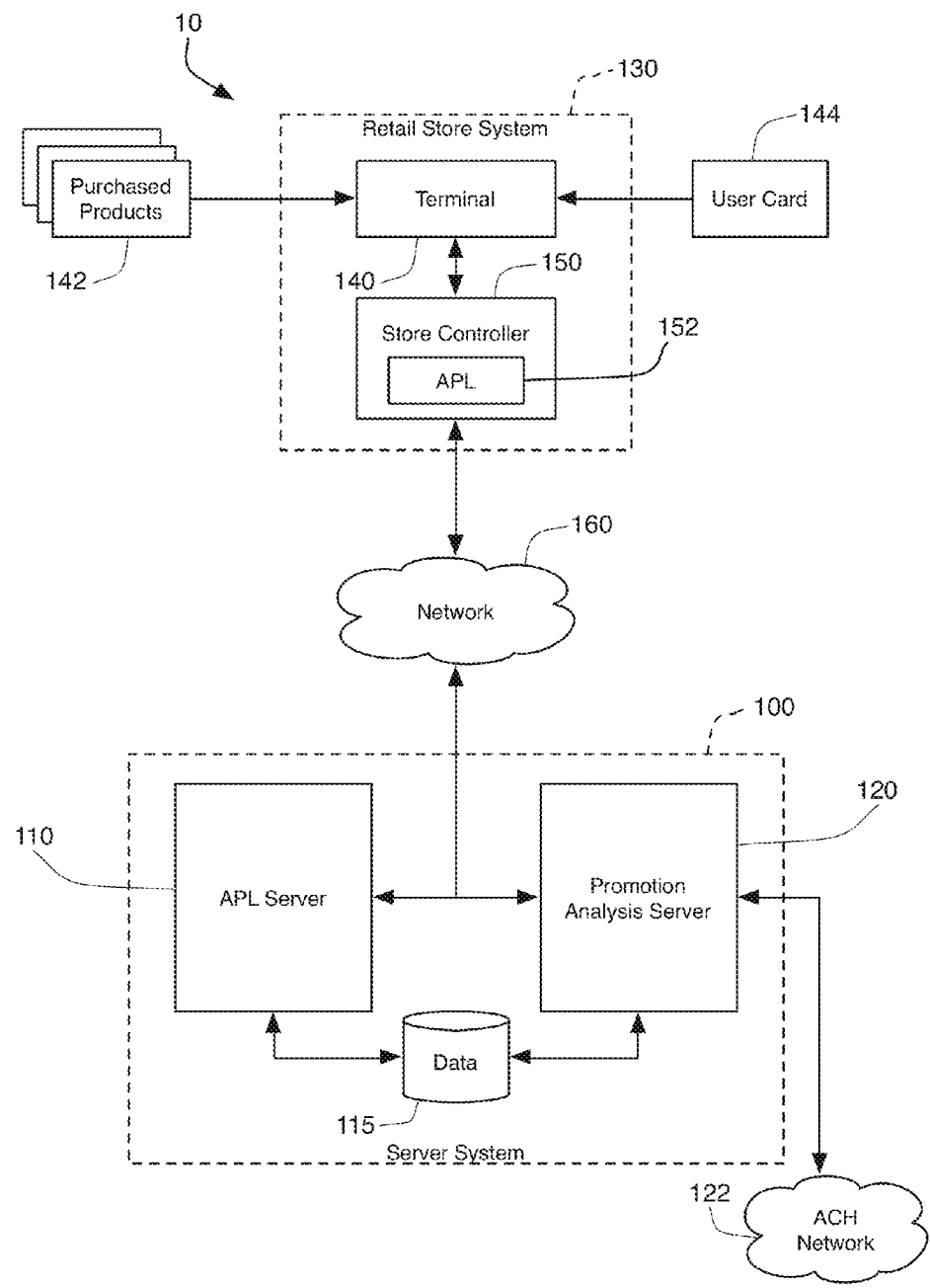
FIG. 1 is a system diagram showing the primary components of one embodiment of the present invention.

FIG. 1: System Configuration and Overview

FIG. 1 shows a promotion management system 10 in which a server system 100 communicates with a retail store system 130 over a network connection 160. The server system 100 is shown consisting of an approved product list (or "APL") server 110 and a promotion analysis server 120, each of which may take the form of one or more computer systems. Similarly, the retail store system 130 traditionally takes the form at least one store terminal 140 and a store controller 150. The terminal 140 may be a point of sale or electronic cash register (POS/ECR) computer system that processes products or other items 142 provided for purchase by a consumer. The store controller 150 communicates with each of the terminals 140 within a retail store environment, and may also be responsible for managing external communication such as over network 160.

In the system 10, the APL server 110 is responsible for developing a list of approved products for which promotions are managed by the server system 100. This list is preferably created with help of a database 115. The approved product list (APL) is then transmitted to the retail store system 130 over the network 160 and saved as APL 152. A user presents their selected products 142 for purchase at the terminal, and also presents a user card 144. Based on an identifier on the user card 144, the retail store system 130 (in either the terminal 140 or the store controller 150) determines which products in the APL 152 are relevant for the consumer presenting the card 144. The products 142 presented for purchase are then compared against this portion of the APL 152 to create a filtered list of products being purchased that are potentially eligible for discounts. This list is then sent by the retail store system 130 along with a user identifier (such as a card ID found on the user card 144) to the promotion analysis server 120.

The promotion analysis server 120 then examines the database 115 to determine the benefits that are still available for that identified user. If benefits remain for the products purchased 142, the promotional analysis server will calculate the available discounts and update the available benefits in the database 115. The calculated discounts are then transmitted over the network 160 to the retail store system 130, where they are then applied to the purchase price of the products 142. The server system 100 then uses the discount calculated to debit accounts owned by the sponsors of the promotions, and credit the account of the retailer that owns the retail store system 130. In one embodiment, either or both of the credit and debit transactions can take place over the ACH network 122 accessed by the server system 100. Note that the actions of the APL server 110 and the promotion analysis server 120 need not be performed on physically distinct computer systems, nor need the terminal 140 and store controller 150 be physically distinct systems.

Figure 2:
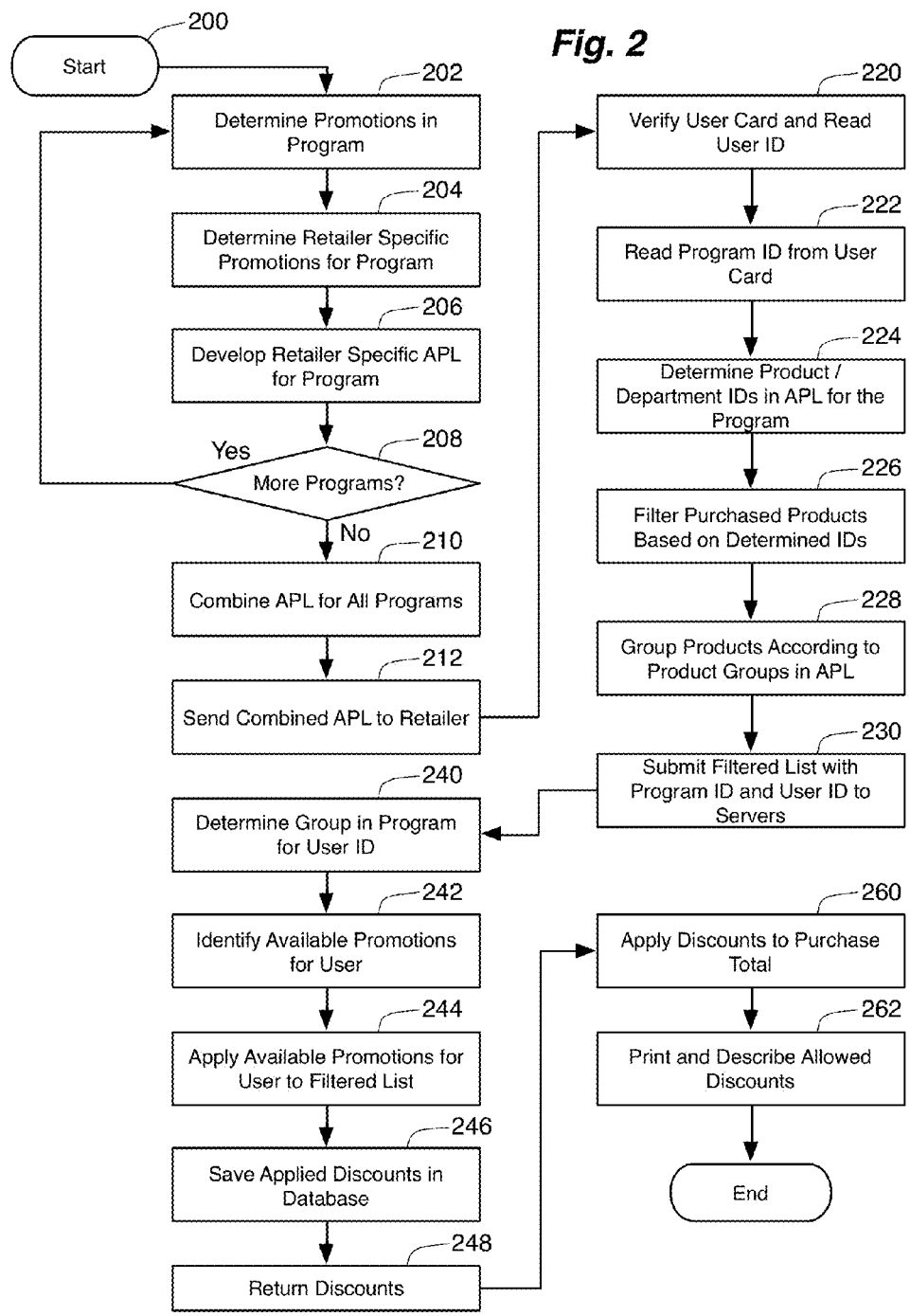
FIG. 2 is a flow chart showing a method to perform one embodiment of the present invention.

FIG. 2: Overall Method

FIG. 2 shows a method 200 that can be used to manage promotions and programs using system 10. A promotion generally takes the form of a discount on an item. Some example promotions that can be supported by the system 10 include:
1) $1.00 off a particular product,
2) 20% off of any product sold under a common brand,
3) a buy one get one free promotion for a product,
4) $5.00 stored value credit for any product in a particular category or product group (such as fruits and vegetables), or
5) 25% off any item in a product group, up to a maximum benefit of $50 per month.

More detail on the possible promotions can be found in Table I of this disclosure.

A program is a set of promotions provided to users. A fuller description of programs is provided below in connection with FIG. 7. For example, an employer may provide employees with a promotion to promote healthy eating by creating a program with a variety of promotions for healthy foods. The employer can fund some of these promotions, and then seek partners to pay for others of the promotions in the program (or the administrator of the system 100 could assist in finding partners). A health food brand may agree to pay for a 5% discount on all of their products, while a vitamin brand may agree to provide $1 off any purchase of at least $10 of their vitamins. The employer would provide a card for this promotion to their employees that they can use at a variety of retail stores.

While the card is accepted and redeemable at many different retailers, the employer may be able to convince one or more of the retailers to add their own promotion to the program. For instance, a first retailer may agree to provide an additional 5% off of fruits and vegetables, while a second retailer may agree to a $5 discount off of any purchase made from their organic food department that exceed $50. A third retailer may refuse to participate in the program at any level.

Approved product lists are generated on a retailer-by-retailer basis. This means that in order to generate an APL in method 200, the APL server 110 must identify all of the general promotions that make up a program in step 202, and then identify any retailer-specific promotions that the retailer has agreed to add to this program in step 204. Once all the general and retailer-specific promotions are identified for a program, the APL server 110 will generate a list of products that are covered by these promotions. This list of products is the approved product list for that program, and is created in step 206. In the preferred embodiment, the server system 100 can handle a plurality of programs created by a plurality of program sponsors. If additional approved product lists need to be created for additional programs, as determined by step 208, the method returns to step 202 for the next program. If the approved product lists for all programs have been created, then these APLs are combined in step 210 and sent to the retailer store system 130 in step 212. Of course, because this combined APL includes products covered by retailer specific promotions in the programs, a different APL will be sent out to different retailers. More detail on the content and format of an APL is described below in connection with FIGS. 3 and 8.

Step 220 is shown on the right side of FIG. 2, as are steps 222-230 and steps 260-262, which indicates that in one embodiment these steps take place on the retail store system 130. Steps 202-212 and 240-248 are on the left side of FIG. 2, and in this embodiment are performed on the server system 100. At step 220, the terminal 140 reads a user card 144. In some embodiments, the terminal 140 will verify that the card 144 is valid, such as by comparing expiration data found on the card 144 with the current date maintained by the terminal 140. In the preferred embodiment, the terminal 140 reads both a user identifier and a program identifier from the card 144. The program identifier is read at step 222, and is used to identify at step 224 those products on the APL received by the retail store system 130 that are applicable to the program of which the user is a member. To speed up this process, the APL could be formatted in a binary-keyed format. Alternatively, the APL could reside on the controller 150 in ASCII format. At step 226, the terminal 130 examines the products 142 being purchased by the user, and then filters those products against the relevant product identifiers in the APL for the user's program. A primary lookup is performed based on a Universal Product Code (UPC) or Price Lookup Code (PLU) that identifies a particular product. In other words, if a user purchased wine, beer, and organic granola, and the promotions in the program only apply to the organic granola, the filtering step 226 allow through only the product identifier for the granola. If the promotion applies to an entire department as opposed to a particular product, a secondary lookup is performed based on the indicated department.

In some cases, the APL for a program may include product groups, which are explained in more detail below in connection with FIG. 4. If some of the products purchased by the user and filtered in step 226 are part of a product group in the APL, those products will be totaled together as a single item in the filtered list of products in step 228. This filtered list of products is then submitted along with the user ID by the controller 150 over the network 160 to the promotion analysis server 120. In some cases, the program ID may also be transmitted.

As described below in connection with FIG. 7, a particular program may be divided into groups. If the program identified by the card 144 is divided into groups, the user identifier received along with the filtered product list will be used to identify which group in the program is assigned to the user. This is done because some groups in a program have specific promotions assigned to it that are not assigned to other groups in the same program. Once the group is identified in step 240, the applicable promotions for the user are determined in step 242. This step 242 involves two steps. First, the relevant promotion or promotions for each item in the filtered list received from the retail store system 130 must be identified. In the second step, the database 115 is referenced to determine whether or not the user has benefits available to him or her for each promotion. For example, a promotion may provide for 20% off of fruits and vegetables, with a maximum discount of $10 in any calendar month. The database 115 will track how much of this $10 maximum discount is left for this user in this month. If only $2 remain of this maximum, the method 200 will only grant the user at most $2 for this promotion. This particular benefit would then be automatically reset at the beginning of the next month.

At step 244, those promotions that are available to the user are then applied to the filtered product list and discounts for each promotion are calculated. If more than one promotion applies to a particular product on the filtered product list, the promotion analysis server 120 will use a consistent rule set to determine the order in which the promotion is applied. For instance, a percentage discount may be applied first, then a buy-one, get-one discount, and then a stored value credit would be applied.

In one embodiment, a multi-pass discount rule is applied in step 244. In this exemplary embodiment, a particular product is allowed to receive only one discount per pass, but may receive a separate discount in each pass, if available. On the first pass, standard discounts available at the product level and department level are calculated. A maximum available discount is applied to each item. For example, if a single product is eligible to receive either $1.00 off the product or 10% off the product, the greater discount will be applied. On the second pass, special department-level discounts may be applied. For example, an additional discount on all products in a selected product group could be applied. In one embodiment, discounts that apply to fresh fruits and vegetables as a department are applied on the second pass. On the third pass, special department-level rewards are applied. These rewards may stored-value rewards, in which a user can spend up to a monthly limit on a particular department of goods. This third pass can again be limited to a particular department, such as fresh fruits and vegetables. On a fourth pass, standard stored-value rewards can applied that relate to all purchases and not just the special department singled out for the third pass. It is within the scope of the current disclosure to use alternative discount rules as required for different business processes.

The discounts applied are then saved in the database 115 at step 246, thereby updating the benefits available to the user for the next purchase transaction. The various discounts (promotions) that have been applied to the filtered product list are then returned to the retail store system 130 in step 248.

At step 260, the store controller 150 or terminal 140 then applies the discounts to the purchase transaction and updates the total amount due for the purchase in step 260. Preferably, the discounts and how they were applied are printed on the customer receipt in step 262.

FIG. 3: APL Contents

FIG. 3 shows the contents of an approved product list 300 in the form of a table. The APL 300 contains a plurality of records, starting with a header record and ending with a trailer record with a plurality of detail records in between. Each record consists of several fields that vary depending on the record type. The detail records contain the actual list of approved products, and are therefore described in more detail herein—one of skill in the art could easily identify the contents and purposes of the fields in the header and trailer records.

A detail record identifies itself as a detail record in the record type field, and maintains a count of detail records in the record sequence field. Each detail record will identify a product or retailer department as belonging to a particular program. Consequently, each detail record contains a program code field to identify a program, and a product code data field to identify a particular product or department. As shown in FIG. 3, the first digit of the product code identifies whether the product code contains a universal product code (UPC or Price Lookup Code (PLU) (when the first digit is a 0), or a department code (when the first digit is a 2). Each retailer uses different codes to identify their departments. For example, one retailer may identify fruits and vegetables as department 10001, and deli items as department 10002, while another retailer may use a different numbering scheme. This means that the server system 100 must have knowledge of the actual department numbering scheme used by the retailers that support the system 10 in order to provide department level promotions.

The product group code field, if used in a record, identifies a particular product as belonging to a product group. The product group code can be used to consolidate multiple different products into a single entry in the filtered list provided by the retail store system 130. The type code field identifies a particular product as belonging to a special select product group. The type code field is used to help the server system 100 apply special additional discounts and rewards. In one embodiment, the type code is used to indicate that the second and third pass of the multi-pass discount rule applies to this product. The type code is included with the filtered product list that is sent from the retail store system 130 to the server system 100. A single product may have both a product group code and a type code. The authorization type field allows for partial functionality of the server system 100 (such as substantiation only and no discount calculation at the server system 100), while the settlement code field allows for communication from the server system 100 to the retail store system 130 concerning how payment for each discount will be handled.

Figure 4A:
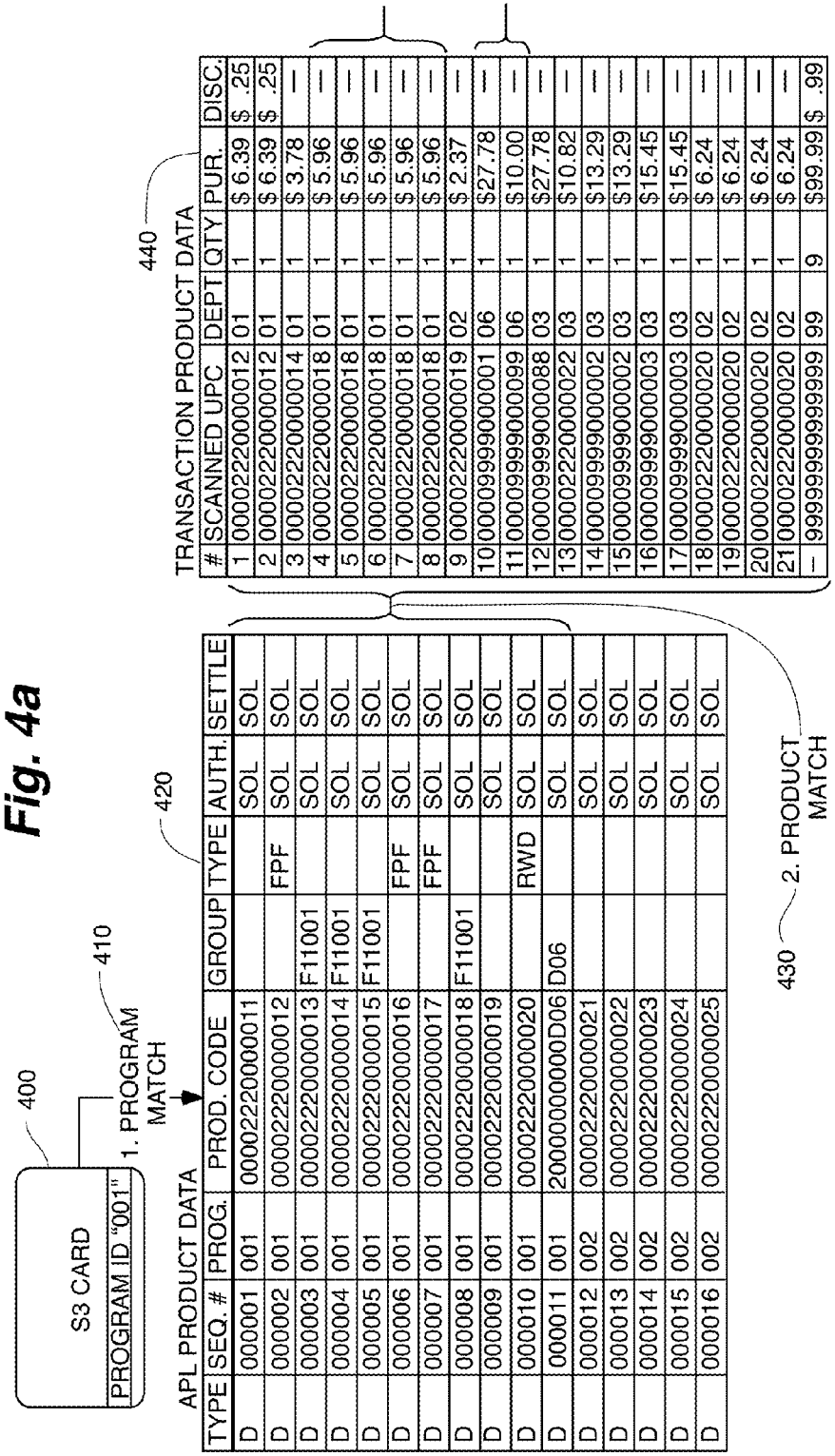
FIG. 4 is a schematic diagram showing the process of filtering purchased products using an approved product list and rolling up products within a group.
Figure 4B:
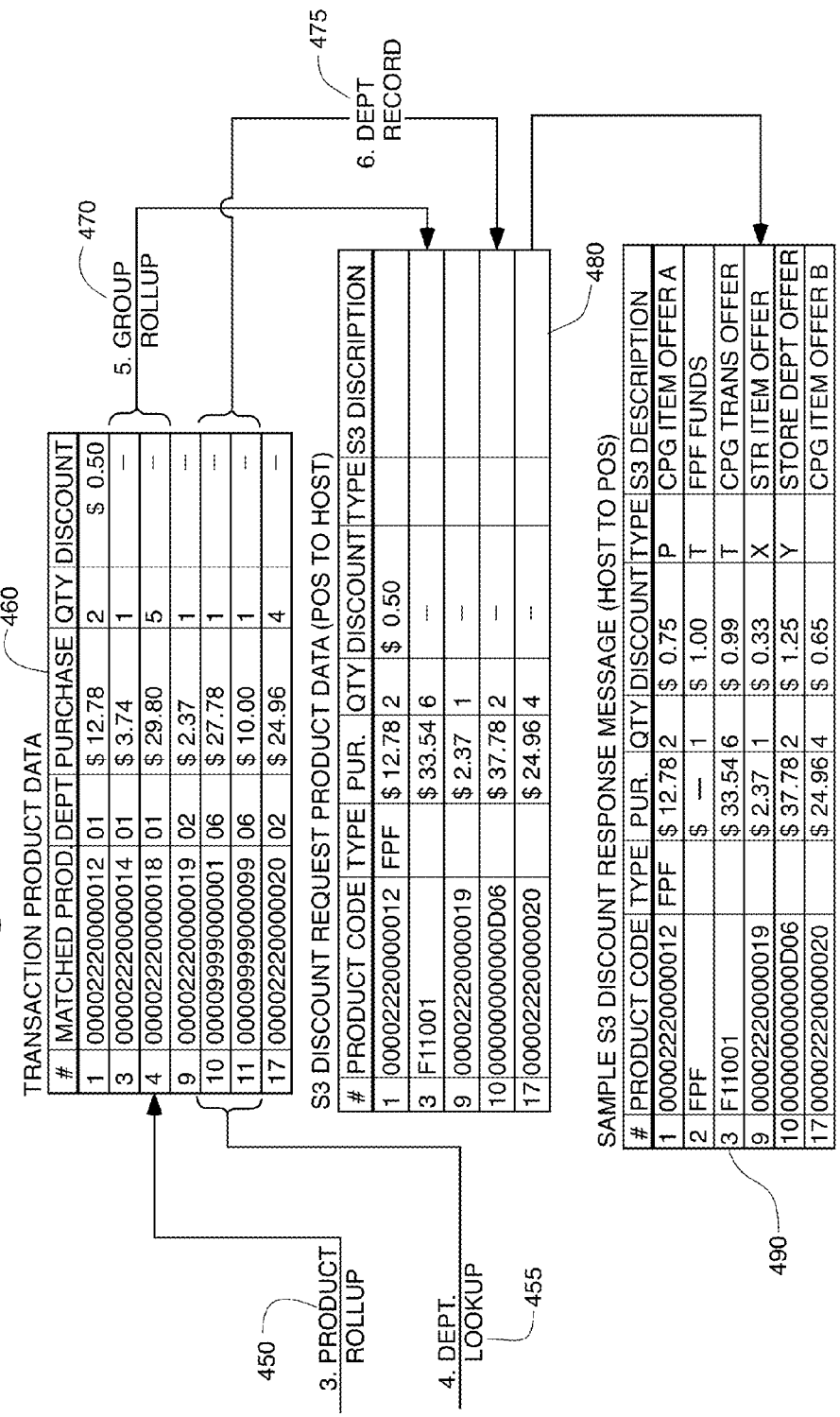

FIG. 4: Filtering Example

FIG. 4 provides an example how an approved product list 420 can be used to filter product purchase data 440 into a filtered product list 460 and eventually a filtered product list with group rollup 480. In this example, a user card 400 is presented that contains a program ID of "001". The APL 420 received by the retail store system 130 from the server system 100 is consulted to identify those data records that relate to this program 001. In FIG. 4, data records 000001 to 000011 relate to program 001, while data records 000011 to 000016 relate to program 002. The identification of relevant promotions in the APL 420 based on the program ID on the card 400 can be referred to as the program match, as indicated by arrow 410. Note that data records 000001-000010 relate to particular product UPC or PLU codes and not departments, as in each case the product code field starts with the numeral 0. Data record 000011 relates to a department code, because the product code field starts with the numeral 2. The department product code after the numeral 2 (and after the leading zeros) is "D06." This data record 000011 also designates that group code as D06. Four of the product codes are part of group F11001. In addition, three of the codes have a type code value of FPF and one has a type code value of RWD. The type code values FPF and RWD indicate that the corresponding products belong to a special select product group that may be eligible for special additional discounts.

The eleven relevant promotions in the APL 420 are then used to filter all of the items purchased by the user. The scanned UPCs for purchased products 142 are shown in table 440, which includes a product identifier (UPC or PLU), a department code, a quantity, a purchase price, and a discount that has already been applied to this product by the terminal 140. These already-applied discounts are not related to promotions managed by system 10, and may include, for example, paper coupons presented by the user at the terminal 140. In step 430 the product codes of the relevant promotions in APL 420 are matched against the scanned product codes in transaction product data table 440. Product data filtering occurs at product-level filtering 450 and department-level filtering 455. The primary product-level filtering 450 matches scanned UPCs in table 440 to product codes in APL 420. The secondary department-level filtering 455 matches a department code in table 440 to a department product code in APL 420. The resulting filtered product list 460 indicates those products that were purchased by the consumer for which promotions are being maintained by the system 10 for program 001. The list 460 includes not only the product identifiers, but also the department code, purchase price, purchase quantity, and the previously-applied discounts. The process 450 includes rolling up multiple entries of a single product identifier in the transaction product data 440 into a single row of the filtered product list 460, which indicates the total quantity and price paid for all of the items.

Two of the products in the filtered products list 460 are part of group F11001. These group members are combined in group rollup step 470, and put into a single entry discount request table 480 having the group identifier F11001 as the product code. The department rollup 475 combines the filtered department 06 group members into a single entry in table 480. The discount request table 480 contains a product or group code, a type code, a purchase price, a purchase quantity, and previously-applied discounts. The discount request data table 480 is sent to the server system in step 230, described above.

Notably, the filtered product list 480 is the complete set of information that is shared with the server system 100. The transaction product data 440, containing a record of all products purchased in the transaction, is not passed to the server system 100. This is advantageous for retailers who wish to keep secret the valuable business analytic data from customer transactions.

The server system 100 receives the table 480 and performs the processes described in connection with steps 240-248 in FIG. 2. The table 490 of FIG. 4 represents the data that the server 100 sends back to the retail store system 130 in step 248. The discount response table includes the product or group code, a product type, the purchase price, the purchase quantity, a total discount, a discount type (P, T, X, or Y), and an abbreviated description of the discount applied. The "FPF" entry in the product code column of table 490 indicates that a special additional discount was applied. These discounts are then used by the retailer to calculate the total price for the purchase.

The discount types X and Y represent discounts sponsored by the retailer processing the transaction. Discount types P and T refer to discounts sponsored by outside sources such as product manufacturers, employers, insurance companies, or other entities providing discounts. When calculating sales tax on a customer's purchase, the retailer-sponsored discounts X and Y are treated as a price reduction, but the outside discounts P and T are treated as tender. The X and Y discounts are not taxed, but the P and T discounts are taxed. In this way, the burden of determining taxable and non-taxable discounts is shifted from the retailer to the system server 100.

Figure 5:
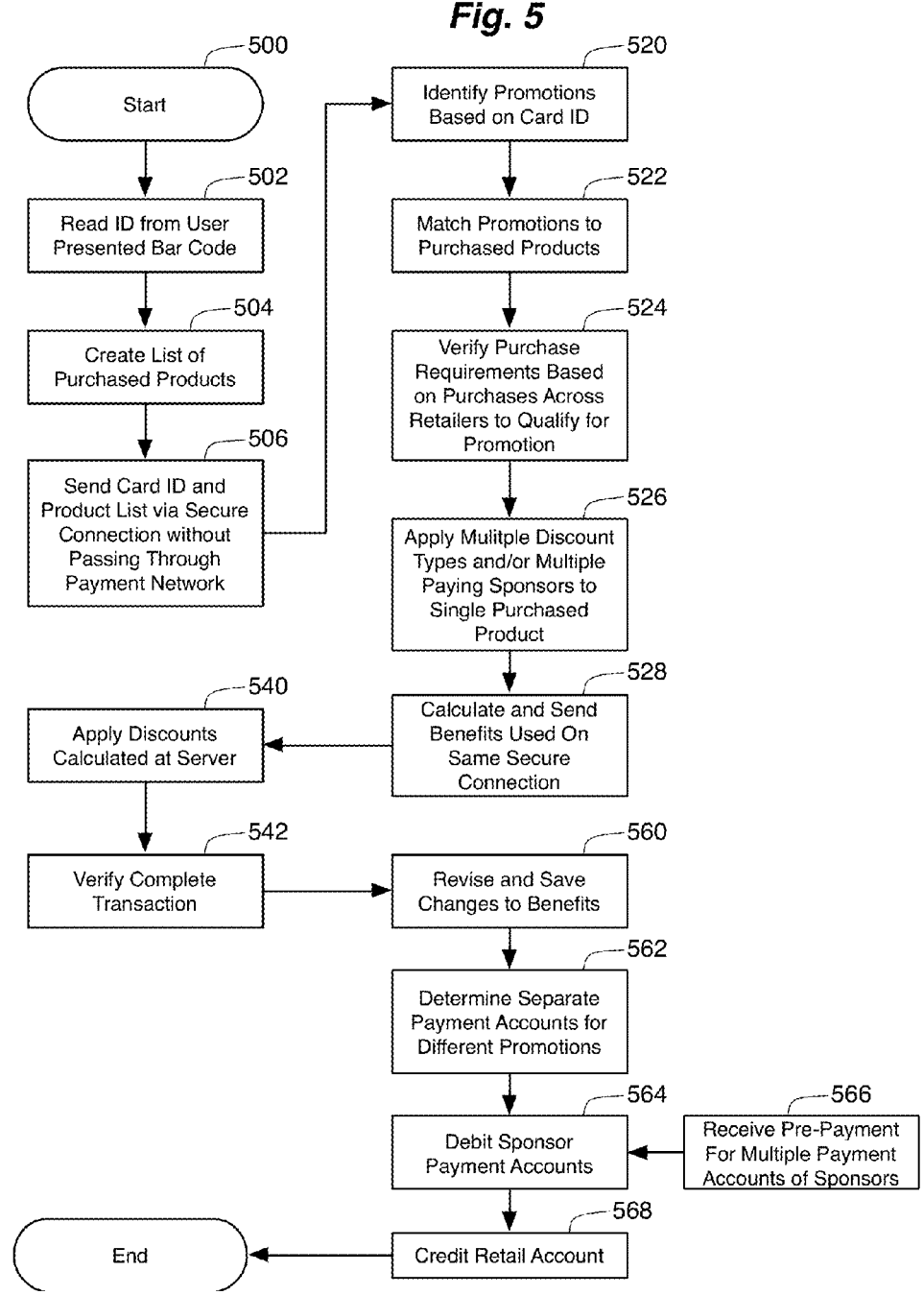
FIG. 5 is a flow chart showing a method to perform an embodiment of the present invention.

FIG. 5: Alternative Method Description

The method 500 of FIG. 5 presents an alternative understanding of one embodiment of the present invention. In FIG. 5, steps on the left hand side are performed at or for the retail store server 130, and steps on the right hand side are performed at or for the server system 100. The method 500 starts at step 502 with the reading of a bar code presented by the user. It is highly preferable to read a bar code at a retail store terminal 140 rather than a magnetic stripe, as almost all retailers provide only a single magnetic stripe reader at a terminal. This terminal is generally configured to read credit card and debit card numbers from the mag stripe on credit or debit cards, and to send transaction and card number information into proprietary, third party payment networks. It is exceedingly difficult to program additional functionality into magnetic stripe readers given the relatively closed nature of the system. Furthermore, it is very difficult to use data from the magnetic stripe readers outside of the third party payment networks, which typically will charge other parties a per-transaction fee to receive and send data through their network. By optically reading a bar code provided by the user, these difficulties can generally be avoided.

Note that the bar code could be found on a program card, such as card 144. In other embodiments, an app is provided to a user smart phone that allows users to view and maintain some of the information about them and their benefits saved in the data 115 maintained by server system 100. This app is preferably configured to display a bar code on the screen of the smart phone that can be read by the bar code reader attached to the terminal 140. In other embodiments, a wireless transmitter (such as an NFC or RFID transmitter) on the smart phone will transmit to a receiver on the terminal 140 the same information that is provided via the bar code. In particular, the bar code or wirelessly transmitted information should provide at least a user identifier, but it may also provide a program identifier.

At step 504, the retail store system 130 creates a list of purchased products, and then sends that information to the server system 100 in step 506 along with the user ID. It may not be necessary to filter the purchased products using an approved product list if the communication speed over the network is sufficiently fast. In one embodiment, all purchase data is transmitted to the server system 100. Because the magnetic stripe reader is not utilized, it is not necessary to send this information over a dedicated payment network. In one embodiment, a virtual private network between the server system 100 and the retail store system 130 is created over the Internet 160 to ensure fast, direct, and secure communications between these systems 100, 130.

At step 520, the server system 100 identifies promotions available for the user based on the transmitted user identifier. The server system 100 may also use an identifier of the retail store system 130 sent at step 506 to identify promotions that are available only at that retailer. Those promotions are then matched up against the purchased products in step 522. The server system 100 also determines whether or not the user has benefits available under each promotion. For instance, a buy one/get one promotion may be usable only once per calendar month, and the server system 100 will determine whether the user has taken advantage of the promotion in the current month before applying the promotion to the purchased products. In step 524, the server system 100 determines that a particular promotion has a purchase requirement, such as buying all three flavors of a product before offering $2.00 off on a new flavor. In the current system, all purchases of these products, including both the triggering flavors and the discounted new flavor, are tracked by the server system 100. This allows purchases made in previous transactions, even transactions made on a different date, to be used by the server system 100 to determine whether the reward discount has been earned. In one embodiment, these purchases can even be made at different, unrelated retailers, allowing a customer to earn a reward by purchasing products at one retailer, and then redeeming the promotional reward as part of a purchase at another retailer.

At step 526, the server system 100 identifies a plurality of promotions that are available to the user for a purchase of a single product in a transaction. For instance, an employer could offer a 10% discount on all whole grain cereals, while the cereal manufacturer may provide a buy one box, get a second box free promotion on their whole grain cereals. The server system 100 uses a rule set to determine the order in which the promotions are applied and then applies both promotions to the purchase. In this case, the promotions are provided by different sponsors (the employer and the cereal manufacturer), both of who will reimburse the retailer for providing the discount to the user. The method 500 provides a very powerful way to apply multiple promotions, because multiple discounts of different types (percent discount vs. buy one/get one vs. dollar discounts vs. reward discounts for past behaviors) can be applied to a single purchase, even where those different discounts have completely different paying sponsors. In one embodiment, in step 526 the server system 100 executes a rule set with multi-pass discounts as described above in relation to step 244 of FIG. 2.

At step 528, all discounts that apply to the purchased products are calculated and identified in a communication to the retail store system 130. At step 540, the store system 130 applies the discount to the purchased products 540. In one embodiment, once the transaction is complete a verification signal is sent to the server system 100 at step 542 to indicate that the transaction is complete and the discounts have been given to the user. This communication informs the server system 100 that reimbursement for the discount should be provided to the retailer. This confirmation message 542 is required because it is always possible that the user will cancel part or all of the purchase transaction after the discount has been calculated and sent by the server system 100 at step 528. If the user cancels the transaction, then it is inappropriate to reimburse the retailer for the discount provided. When the server system 100 receives this verification, the data concerning the provided discounts are saved in the database 115 at step 560 so that the user cannot reuse promotions beyond what was intended.

At step 562, the server system 100 determines the sponsor for each of the promotions applied to this transaction, and also determines a financial account for each transaction. In the example above, the employer is the sponsor for the 10% discount promotion; while the cereal manufacturer is the sponsor for the buy one, get one promotion. In step 564, an account for the sponsor of each of the applied promotions is debited to pay for the discount provided to the user. As indicated at step 566, the system 10 can be designed to have sponsors establish a financial account that contains funds that are used to pay for the promotions that they are sponsoring. As a result, the system 10 can be assured that the money to pay for the promotions is immediately available upon debiting the account at step 564. At step 568, the server system 100 provides a credit for a retailer account equal to the provided discounts. This credit could be provided by submitting a request for payment to the retailer account from a promotion sponsor account managed by the system 10 through the ACH network 122.

If a promotion is sponsored by the retailer itself, no payment needs to be made to the retailer for that promotion. Instead, an accounting of all redeemed retailer-sponsored promotions is provided to the retailer. The retailer can use this data to charge the promotion to a particular department (e.g., to charge a discount on apples to the produce department). The retailer can also use the promotion use data for business analytics.

As an alternative to the verification transmission 542, the system 10 can be designed to automatically provide reimbursement to the retailer once the discounts are sent to the retail store system 100 in step 528. In this alternatively embodiment, the retail store server 130 would be responsible for sending a cancel message if the user canceled the transaction before being granted the discount. If the cancel message were to be received, the automatic reimbursement transfer would have to be reversed. By delaying steps 564 and 568 for a predetermined time period after sending the discount information in step 528, it should be possible to greatly reduce the number of financial transfers that would have to be reversed. The same could be done with the database update in step 560, although reversing a database change would involve fewer difficulties than reversing financial transactions.

Note that steps found in method 500 can be added to method 200, and vice versa, as desired. For instance, it is contemplated that steps 524, 526, 542, and 560-568 could be added to method 200 without difficulty.

Figure 6:
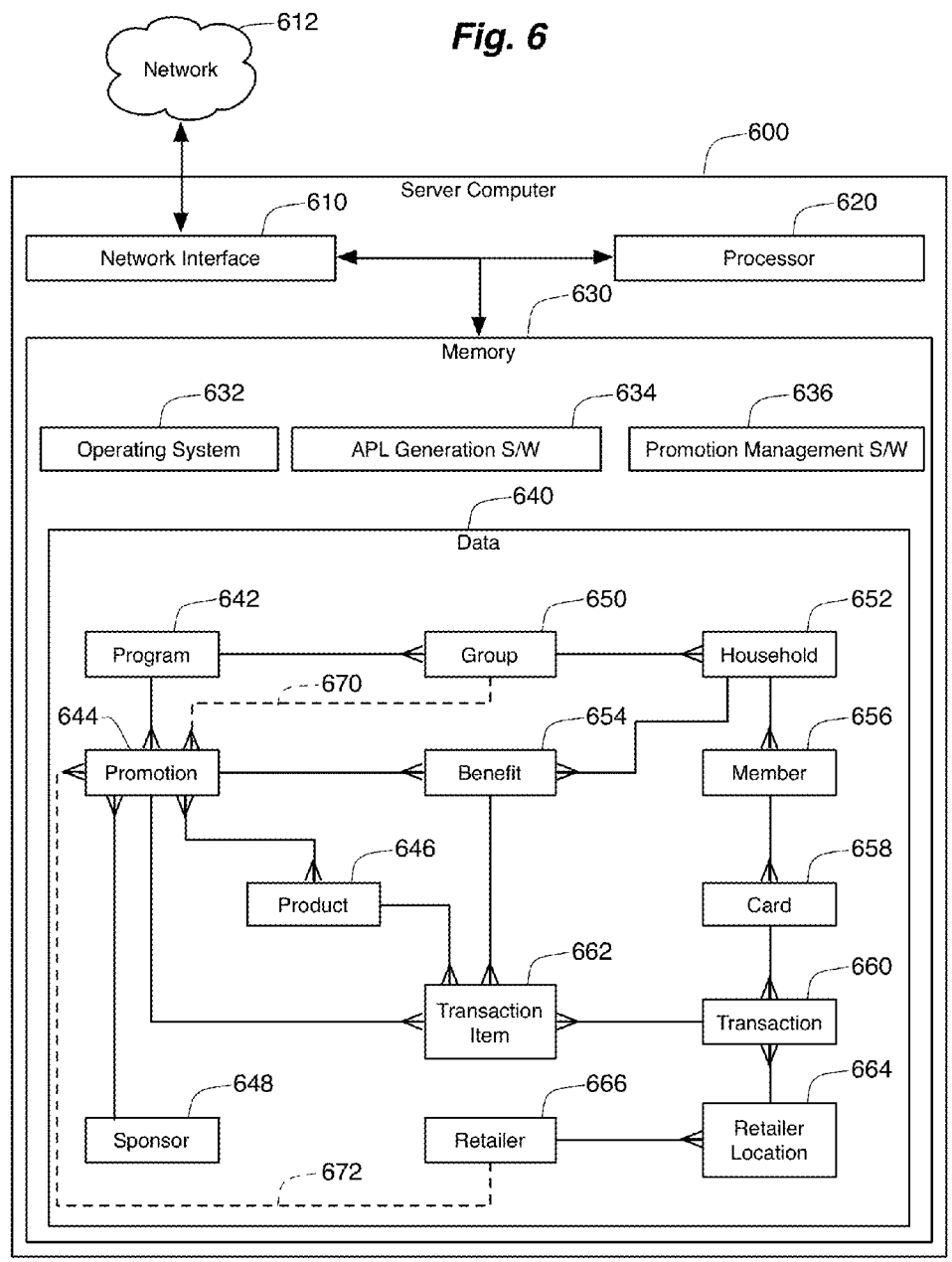
FIG. 6 is a system diagram showing the components of one embodiment of a server computer including the content of the data maintained by the server.

FIG. 6: Computing Configuration and Database

FIG. 6 shows an embodiment of the server system 100 in which a single server computer 600 operates as both the APL server 110 and the promotion analysis server 120. The server computer 600 includes a network interface 610 designed to provide communications with remote devices over a network 612. In one embodiment, the network 612 is the Internet, and the network interface 610 includes TCP/IP protocol stacks for communicating over the network 612. The network interface 610 may connect to the network 612 wirelessly or through a physical wired connection. The server computer 600 further includes a programmable digital processor 620 designed to operate programming code stored on a memory 630. The processor 620 is preferably a general purpose CPU such as those manufactured by Intel Corporation (Mountain View, Calif.) or Advanced Micro Devices, Inc. (Sunnyvale, Calif.). Memory 630 preferably includes a non-volatile, non-transitory, computer readable medium such as a hard drive or flash memory device. Software instructions 632, 634, and 636 found on the memory 630 instruct the processor 620 how to perform the methods of the present invention, including the methods 200, 500 set forth in FIGS. 2 and 5 above. More specifically, the operating system instructions 632 perform OS management functions that allow the server computer 600 to operate while the APL generation software 634 allows the server computer 600 to operate as the APL server 110. Similarly, the promotion analysis software 636 allows the server computer 600 to operate as the promotion analysis server 120. To improve efficiency, the processor 620 may load software instructions 632, 634, 636 from non-transitory portions of memory 120 into a faster but volatile RAM portion of the memory 120. Data 640 operated upon by the processor 620 can also be stored in non-volatile memory and retrieved into RAM for analysis, recording, and reporting.

The construction of the terminal 140 and store controller 150 is similar to the server computer 600 in that each device contains a processor 620 and programming instructions 632-636 on memory 630 that instruct the processor 620 on how to perform the methods of the present invention. As explained above, any of these devices 110, 120, 140, 150, 600 could easily be implemented as multiple physical computing devices operating together to perform the functions provided in the software.

In the preferred embodiment, the data used by the server computer 600 is stored in a database 640 managed by processor 620 under software programming instructions 634, 636. The database 640 can store data in pre-defined fields in a database table or as database objects in an object-oriented database environment. FIG. 6 shows the database 640 with tables or objects for programs 642, promotions 644, products 646, sponsors 648, groups 650, households 652, benefits 654, members 656, cards 658, transactions 660, transaction items 662, retailer locations 664, and retailers 666. The database 640 tracks relationships between each of the data entities 642-666, which are shown using crow's foot notation between the entities in FIG. 6. For instance, FIG. 6 shows that a single program 642 can be associated with a plurality of promotions 644. As shown in FIG. 6, it is possible to define promotions 644 for a plurality of products 646. For example, a promotion could provide $4 of frozen vegetables of an identified brand every month. This would constitute a single promotion 644, but could apply to a great many products 646. The products 646 to which the promotions 644 apply can be defined by a product number, but can also be defined by a department number, in which case all products in the particular department are included in the promotion 644. Once the promotion 644 was used on any of those products 646, it would be unavailable for any of the products 646 until the next month. Each promotion 646 defines a specific discount, such as 10% off an item. Each promotion 646 also includes the purchase requirements that must be met for the promotion 646 to be applied. Promotions 646 can also define a date range during which the promotion 646 is valid. FIG. 11, described below, shows one embodiment for defining discounts for the promotion 646.

In FIG. 6, each program 642 is associated with one or more groups 650, which are described in more detail in connection with FIG. 7. In many cases, the promotions 644 are associated directly with a program 642, but it is possible to assign promotions 644 directly to a group 650 as shown by the dotted crows foot notation 670. Households 652 are assigned directly to groups 650, with each household 652 being assigned to a single group 650 in a program 642. Benefits 654 are tracked at the household level 652 and are associated with promotions 644. When a household 652 uses a promotion 644, such as $4 of frozen vegetables every month, the benefit table or object 654 tracks this use. When step 242 determines available promotions for the user in method 200, the benefits 654 for the user's household 652 are consulted along with the available promotions 644 for the user's group 650 and program 642. It is possible to implement the benefit table 654 with effective start and end dates. To determine whether the user has used up an available promotion for the current time period, the start and end dates will be examined. For example, a user may wish to take advantage of the $4 of free frozen vegetables. If they had not used this promotion this month, no benefit record 654 would have been created for the promotion 644 that is relevant to the current time period. This would indicate that the user has used none of the benefit 654. A benefit record 654 can then be created with the appropriate start and end date (such as the beginning and end of the current month), and the record can indicate the total quantity available for this promotion (such as 4 for four dollars). If the user purchased only $2.39 of frozen vegetables, the benefit record 654 would record that usage. If another attempt to purchase frozen vegetables were made that month, the benefit record 654 would be recalled, and the vegetables could then be discounted the $1.61 remaining in the promotion for this month. The benefit record 654 would then be updated to indicate that the user had used the entire $4.

Benefits 654 are tracked at a household level 652, which may include multiple (family) members 656. Each member 656 would typically be issued a single card 658, although the issuance of replacement cards 658 would mean that multiple cards 658 could be associated in the database 640 with each member 656. This organization of the database 640 allows the purchasing behavior of each family member 656 to be tracked while ensuring that promotions 644 in the program 642 are provided on a household-by-household basis.

When a retail store system 130 submits a list of purchased products to the server system 100 (step 230 or 506), a new transaction record 660 is created. The transaction record 660 indicates when (date and time) and where (retail location 664 and terminal identifier) the transaction took place. The transaction record 660 also indicates which card 658 was used in the transaction to allow easy identification of the member 656 and household 652 that made the transaction. A plurality of transaction items 662 are associated with each transaction 660, with each transaction item 662 tracking the purchase of a product 646 under a promotion 644. The transaction item 662 is also associated with a single benefit 654 record, indicating that the benefit record 654 was created or modified as a result of this transaction item 662 (or that the benefit was used up and no discount was provided for this transaction item 662). In one embodiment, the receipt of a filtered list with four entries (such as list 480) by the server system 100 would trigger the creation of one transaction record 660 and a plurality of transaction items 662 (assuming the user was otherwise eligible for all four promotions). Some entries in the list may create zero transaction item records 662 (where the user was not eligible for any promotion on that product), while other entries may create one or more transaction item records 662 (depending on the number of eligible promotions that apply to that product).

Each retailer location 664 is likely associated with a plurality of transactions 660 but only a single retailer 666. While some retailers 666 have an only a single location 664, the database 640 allows multiple retailer locations 664 to be identified as belonging to a single retailer 666. As described above, it is possible that some promotions 664 are defined to be associated with only a single retailer 666. This is shown in FIG. 6 as dotted association 672, and described in more detail below.

FIG. 6 should not be taken to indicate that the data entities 642-666 in system database 640 need to be implemented exactly as shown, with each entity 642-666 in the Figure implemented as a single database table or object. Rather, FIG. 6 merely indicates that one or more database entities are created within database 640 to track this information. It is well within the scope of the prior art to implement this type of data using a variety of entity architectures.

Figure 7:
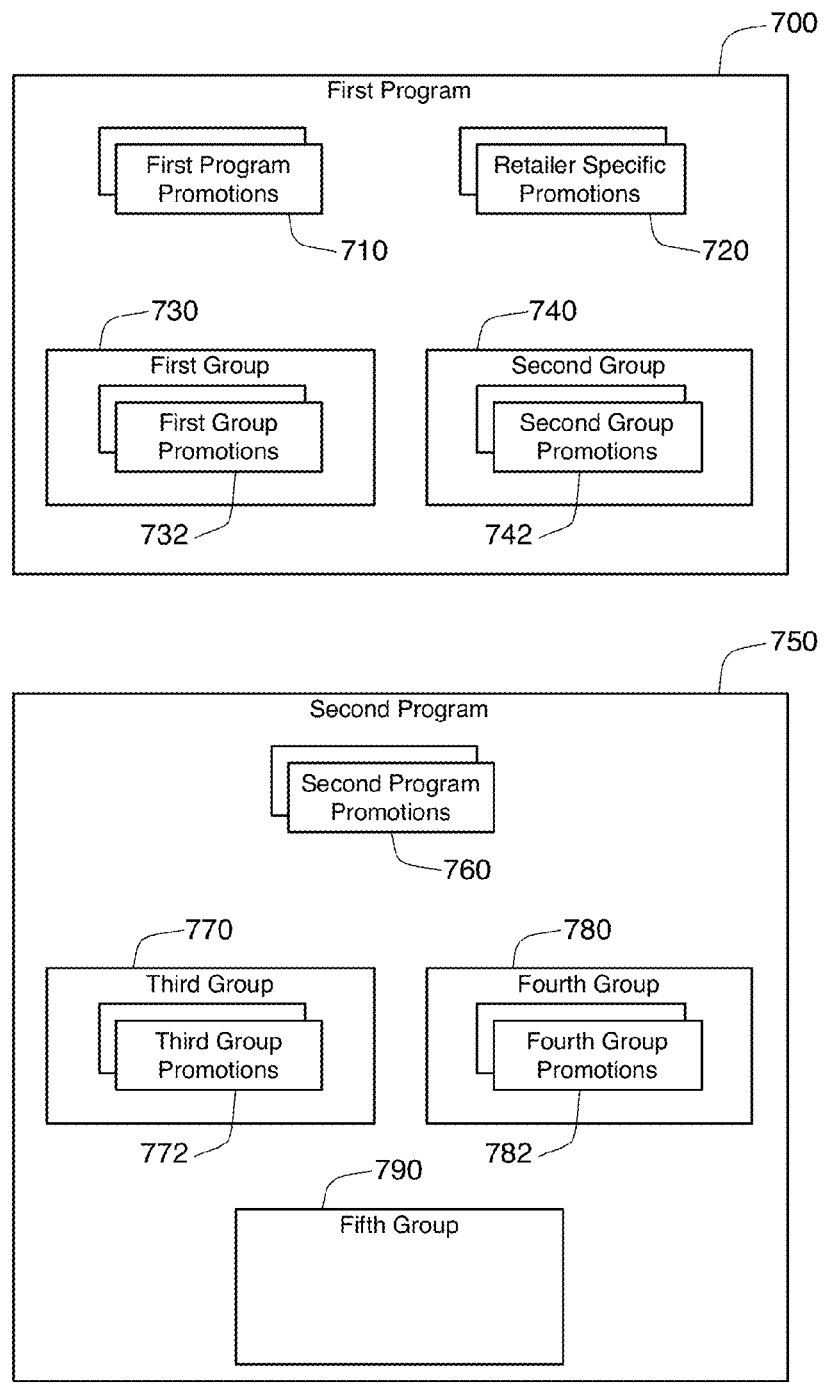
FIG. 7 is a schematic diagram showing the relationship between multiple programs, groups, and promotions.
Figure 8:
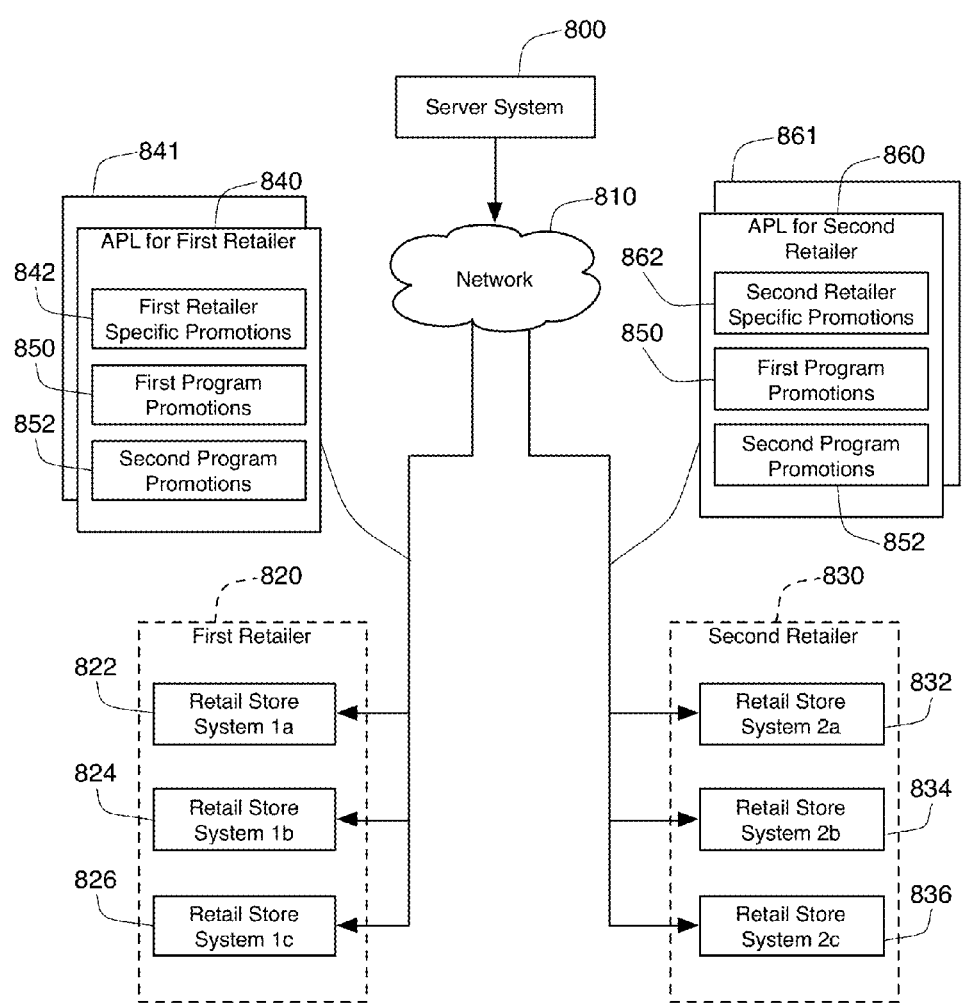
FIG. 8 is a schematic diagram showing the transmission of retailer specific approved product lists to retailer store systems for two different retailers.

FIGS. 7 and 8: Structure of Programs and Groups, and Retailer Specific APLs

FIG. 7 shows schematically the relationship between programs 642, promotions 644, and groups 650. The first program 700 is designed to provide a plurality of promotions to users. The first program 700 might be created by a large entity, such as a health insurance provider, and the users of the program might be insureds that receive insurance from that provider. The health insurance provider agrees to provide a set of promotions 710 in its program 700 to its insureds. The insurance company then encourages each of the employers that provide the health insurance to their employees to add additional benefits to the plan. Each different employer would create a different group within the first program 700 and provide additional promotions to its employees. In FIG. 7, a first employer creates a first group 730 and establishes first group promotions 732 for its employees, while a second employer creates a second group 740 and establishes second group promotions 742 for its employees. In addition, the insurance company may approach a variety of retailers to see if they wish to encourage use of these promotions at their retail establishment by providing their own promotions. In FIG. 7, one retailer has agreed to sponsor multiple retailer specific promotions 720.

Another entity (such as a government agency providing benefits to citizens) could establish a second program 750 with second program promotions 760, and then establish a third group 770 with third group promotions and a fourth group 780 with fourth group promotions 782. Some of the users of the second program 750 do not qualify for any additional programs other than the second program promotions 760. To ensure that all users are assigned to a group 650 within a program 642 in database 640, a fifth group 790 is established that has no group specific promotions 644.

Users are associated with one of the groups 730, 740, 770, or 780. All of the insureds of the insurance company that established the first program 700 would receive identification (such as cards 144, 400 or a mobile device app) that identifies the first program 700 to the retail store system 130. This allows the retail store system 130 to identify which promotions on an APL 300 might relate to the user. The list of promotions in the APL 300 may include promotions for all groups 730, 740 in the first program 700 even though the user belongs only to a single group. The server system 100 would identify which group 730, 740 is associated with the user by determining the household 652 and group 650 in the database 640, and then identify all the promotions currently available for the user. For example, a user in the first group 730 would be eligible for the first program promotions 710 and the first group promotions 732 but not the second group promotions 742 or any of the promotions 760, 772, 782 associated with the second program 750. If this user shops at the correct retailer, they would also be eligible for the retailer specific promotions 720.

All of the non-retailer specific promotions 710, 732, 742, 760, 772, 782 in all of the programs 700, 750 are provided to all retailers participating in the system 10 in a single approved product list 300. Any retailer that has retailer specific promotions 720 in any of the programs 700, 750 will receive a customized approved product list 300 that includes their retailer specific promotions 720 in the programs 700, 750.

This is seen in FIG. 8, where a server 800 provides a first version of an APL 840 for a first retailer 820, and a second version of an APL 860 to a second retailer 830. The server 800 may also provide the retailers 820 and 830 with additional APLs 841, 861 to be implemented by the retailers 820, 830 on a predetermined future date. The APL 840 for the first retailer 820 includes promotions 842 specific to the first retailer 820 as well as the promotions in the first program 850 and the second program 852. The APL for the second retailer 860 includes promotions 862 specific to the second retailer 830 as well as the promotions in the first program 850 and the second program 852. Furthermore, the APL 840 for the first retailer 820 is provided to all the retail store systems 822, 824, 826 operated by the first retailer 820, while the APL 860 for the second retailer 830 is provided to all the retail store systems 832, 834, 836 operated by the second retailer 830.

One embodiment of the present invention requires the communications from the first retailer 820 to include a first merchant identifier and communications from the second retailer 830 to include a second merchant identifier. These merchant identifiers allow the server system 800 to identify the retailer 820, 830 from which it is receiving the communication. This allows the server system 800 to provide the correct APLs 840, 841 or 860, 861 to the retailer's store systems 822, 824, 826 and 832, 834, 836.

Figure 9:
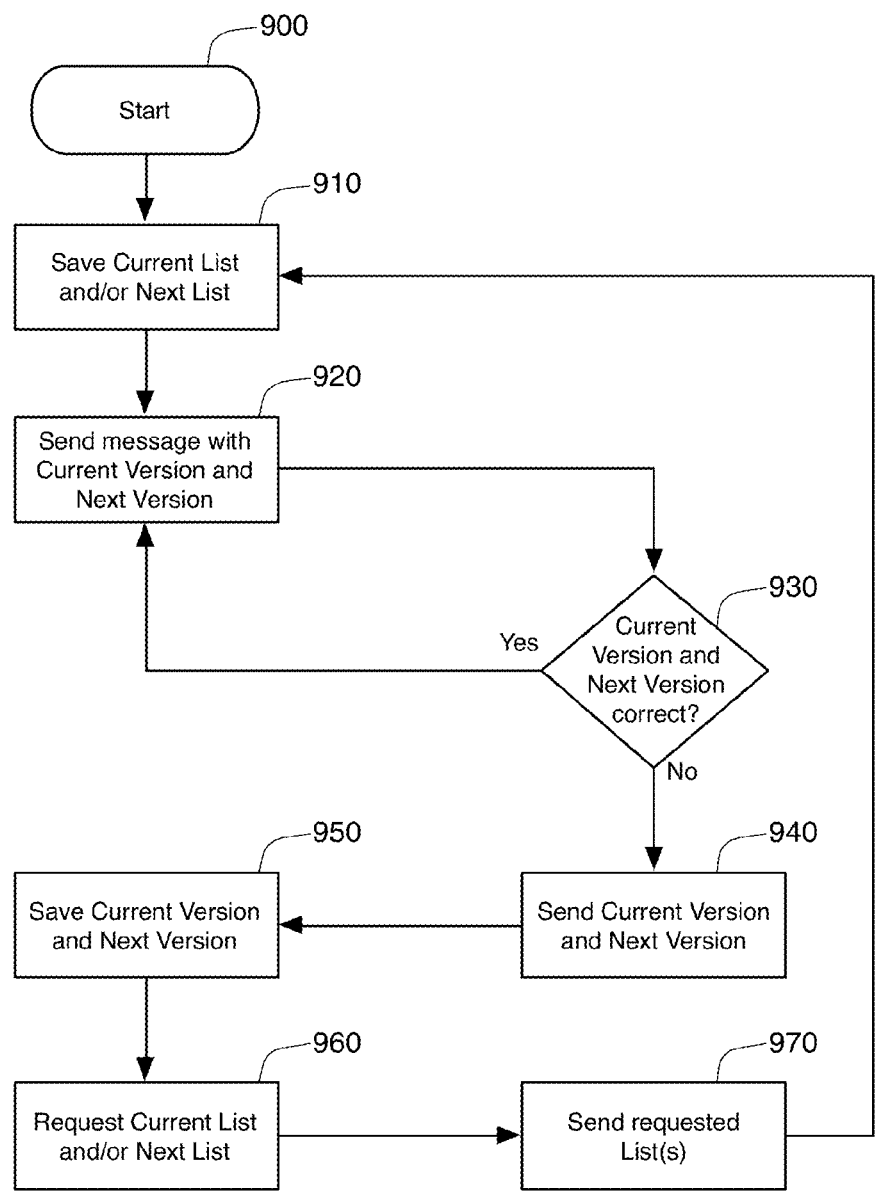
FIG. 9 is a flow chart showing a method of updating an approved product list at a store controller.

FIG. 9: Method for Updating APLs

In the preferred embodiment, the APLs 840, 841 and 860, 861 are provided to the retail store systems 822-826 and 832-836 in a regular manner, such as by the method 900 set forth in FIG. 9. In FIG. 9, the steps that appear on the left side of the page indicate that the steps are performed at a retail store system such as retail store system 822. The steps that appear on the right side of the page indicate that the steps are performed at the server system 800. The method 900 can be used at any of the retail store systems of FIG. 8.

In the flow chart of FIG. 9, a "Current List" refers to APL 840, which is actively used by retail system 822 between a particular start date and end date. A "Next List" refers to APL 841, which is saved at the retail system 822 to be implemented at a predetermined future start date.

Each APL in the system of FIG. 8 has a version designation containing information regarding an implementation date and a version number for that particular APL. In one embodiment, the date and version number are presented as a combined a 3-digit date (day-in-the-year) and a 3-digit sequence number, starting at 001. Thus, a version designation for an APL implemented on January 31 would be designated "031001." If an APL for January 31 needs to be updated, for example if an error needs to be corrected or new promotions added, a new version of the APL would be designated "031002." In FIG. 9, "Current Version" refers to the version designation data of APL 840, and "Next Version" refers to the version designation data of APL 841.

As explained above, a connection between retail system 822 and server system 800 can be made through a VPN connection over the Internet. Rather than just downloading the current APL, the retail system 822 downloads at least two APLs to be used for transactions at the retail system 822. If the APLs are updated daily, then it will be necessary to generate all APLs at least two days in advance so that the next two APLs will be ready for downloading when requested by the retail system 822.

In step 910, a retail system 822 receives a Current List 840, a Next List 841, or both from the server system 800. The retail system 822 then saves the lists 840, 841 locally. List 840 will be used for current transactions, while the list 841 will be saved and implemented on a future date indicated by the version designation data of list 841.

In step 920, the retail system 822 sends includes the Current Version data for APL 840 and Next Version data for APL 841 (e.g., "031001" and "038001") in a message communication to the server 800. The Current Version and Next Version may be included in a data field of the message header. For example, the messages of step 920 may be communications to the server 800 for discount authorization, confirmation, or cancellation. The message may also be a "heartbeat" message sent from the retail system 822 to the server system 800 every 10 minutes if no other communications occur.

In step 930 the server system 800 receives the message and reads the Current Version and Next Version. If there have been no changes to the APLs 840, 841, the server 800 does not take any additional action. In one embodiment, the message headers for communications sent from the server system 800 to the retail store 820 could also contain Current Version and Next Version data, which would act as a confirmation of the Current Version and Next Version data. Most frequently, the Next Version data will change when the server system 800 generates a new APL to be implemented in the future. This will preferably occur during off-peak hours, such as between midnight and 3:00 AM.

If the server system 800 has made any changes in the APL 840 or the APL 841, the updated APLs will have new version designations. In this case, in step 940 the server system 800 will send the correct Current Version and Next Version data to the retail system 822. In step 950 the retail system 822 receives the corrected Current Version and Next Version data and stores the data.

In step 960, based on the corrected Current Version and Next Version data, the retail system 822 determines that one or both of the APLs 840, 841 are out of date. The retail system 822 then sends a request to download the new APL. For example, if the APL 840 Current Version data is updated from "031001" to "031002," the retail system 822 will request the server system 800 to send an updated APL version 031002, which will be saved as the Current List 840. In step 970 the server system 800 sends the requested list or lists to the retail system 822. After step 970, the method 900 returns to step 910, where the updated Current List 840 and Next List 841 are saved at the retail system 822. The method 900 continues as a loop, with the retail system 822 sending the Current Version and Next Version data to the server system 800 to continually verify that the APLs 840, 841 are the correct versions.

Method 900 allows the retail store system 822 to operate with the correct APL even when a network connection cannot be established. It would be a simple matter to alter method 900 to allow three APLs to be downloaded at each connection to allow the retail store system 822 to survive two missed updates.

Figure 10:
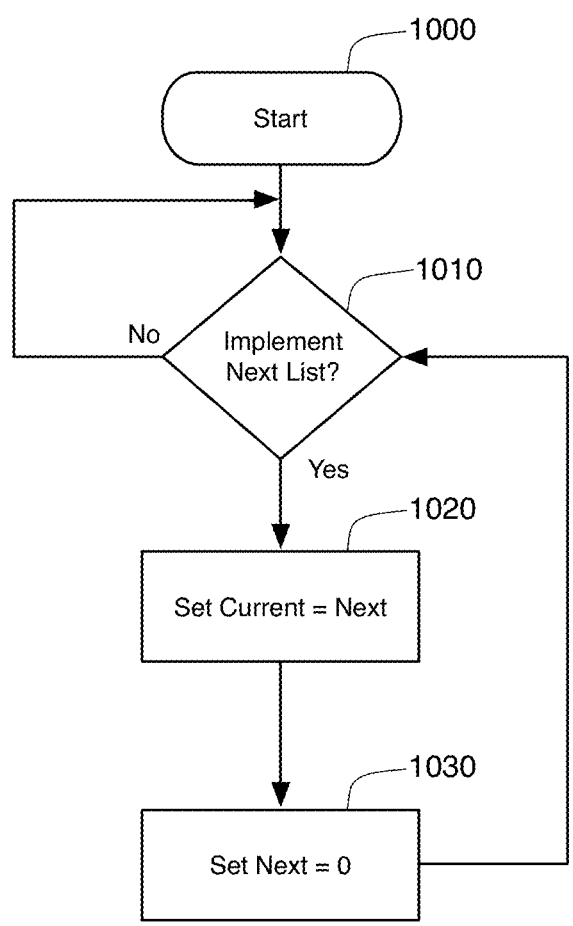
FIG. 10 is a flow chart showing a method for implementing an approved product list.

FIG. 10: Method for Choosing APL Version

In FIG. 10, a method 1000 is presented for determining an APL version for a retail store system 822. The method can be performed entirely at the retail store system 822. The retail system 822 preferably has a current APL 840 and a next APL 841 saved at the retailer system 822. Each APL 840, 841 contains data indicating a time period during which the promotions in the APL 840, 841 are valid. At the beginning of the method, the APL 840 is the Current List of promotions, and the APL 841 is the Next List, to be implemented at a future date. In step 1010, the system determines whether the Next List 841 should be implemented. This could be accomplished by reading expiration date information from the APL 840, or by reading start date information from the APL 841. In one embodiment, the retail system 822 could use the dates in Current Version and Next Version data for the APLs 840, 841 to determine whether to implement the Next List. For example, the Next List 841 may be implemented at midnight on a date specified by the Next Version data.

After step 1010, in step 1020 the Next List is redefined to become the Current List. The APL 841 becomes the Current List and the APL 840 becomes an expired list that will no longer be used by the retail system 822. If the retail system 822 does not have any additional stored APLs, there will not be a Next List. In this case, the Next List is set to null at step 1030. In one embodiment, after step 1030 the retail system 822 may send a request to the server system 800 to download a Next List, if such a list is available.

FIG. 11: Promotion Definitions

FIG. 11 shows a table 1100 of data defining different promotions for a program. With reference to FIG. 6, the promotion definitions 644 may be stored in a database 640. Each individual promotion 644 contains detailed information about the promotion. For example, an individual promotion record 644 contains information about the product or department to which the promotion applies, activation and expiration dates, the discount type, discount value, purchase requirements, the program or group receiving the promotion, the promotion sponsor, the retailers that will accept the promotion, and other such information as will be described.

Each promotion 644 will be applied to at least one program 642. A promotion 644 may apply to all members 646 in a program 642, or the promotion 644 may only be available to members 646 who belong to a particular group 650 within the program 642.

The promotion 644 must have a discount type, which may be either a percent discount or cents off discount. The discount type is associated with a discount value, such as 10% or $0.50. A percentage discount type may also have an associated NTE ("not to exceed") value that caps the dollar amount that the promotion 644 can provide to the member 656. The discount may also be associated with a maximum product price or "copay." For example, the promotion 644 may offer a particular product 646 for $0.99. This "copay" is the maximum amount that the member 656 will be charged for the product 646.

Each promotion 644 is defines the benefits available for this promotion. The available benefits are defined by a benefit type (e.g., units or dollars) and a value that indicates either how many units the discount can apply to (e.g., discount can be used on up to three units of a product), or a maximum dollar amount to apply (e.g., up to $5.00). The benefit available data also includes a duration, which may either be a single transaction (i.e., the discount can only be used once), or a time period during which the promotion 644 can be used many times. If the benefit is available for a specified time period, the promotion 644 can be used across multiple retailers 666 accepting the program 642. The duration may also be a multiple number of uses, such as that the particular promotion 644 can be used three times. When a customer uses a promotion 644, this use is stored in the benefit database entity 654 and compared with the benefits available for the promotion 644 to see if the customer still applies for the promotion 644

The promotion 644 also includes purchase requirements that must be met to qualify for the promotion 644. The purchase requirements will include a product identifier or department identifier. A purchase requirement type such as number of units or dollars is associated with a purchase requirement value, for example 3 units, or $10.00. A purchase requirement duration specifies the timing in which the promotion 644 is available. For example, if the purchase requirement duration is equal to "transaction," the member 644 must fulfill all of the purchase requirements in a single transaction in order to receive the promotion discount. Alternatively, the purchase duration could be a time period, which aligns with the assigned activation and expiration dates for the promotion 644. In this case, a member 646 could fulfill a purchase requirement over the time period and still receive the discount.

In one embodiment of the system, each product 646 associated with a promotion 644 is identified as a primary product or secondary product. This categorization is used if a promotion 644 has a purchase requirement such as buying one type of item and receiving another type of item for free. In this embodiment, a "secondary" product is defined as the product that must be purchased. For example, a promotion 644 could support a "mix 'n' match" promotion where a member 656 must buy a certain number of "secondary" products, after which the member 656 can receive a discount on a different "primary" product. For example, this could be implemented in a promotion 644 in which a member 656 must buy three boxes of a particular brand of cereal (i.e., "secondary" products), after which the member 656 receives a gallon of milk (i.e., a "primary" product) for free. If the purchase duration requirement is a time period, the member 656 may buy the secondary products during a first transaction, and receive the discount on the primary product during a subsequent transaction, which could be at the same retailer or a different retailer.

The system and methods described above are exemplary and are not the exclusive techniques for using the disclosed embodiments. Numerous modifications and variations will readily occur to those skilled in the art. Because such modifications are possible, the invention is not to be limited to the exact construction and operation illustrated and described. Rather, the present invention should be limited only by the following claims.

What is claimed is:

1. A method of discounting products during a retail transaction comprising:
   a) at a server system, transmitting a first list of promoted products to a retail store system, the first list of promoted products containing product identifiers for the promoted products and, for at least two products, a common group identifier;
      wherein a first set of products have product identifiers that are associated with the common group identifier, and
      wherein a second set of products have product identifiers that are not associated with the common group identifier;
   b) at the retail store system, operating a point of sale terminal having a product scanner to scan product identifiers relating to products from a single purchase transaction;
   c) at the retail store system, generating a filtered list of products being purchased in the single transaction at the retail store system by filtering the data received from the product scanner against the first list of promoted products,
      wherein the single transaction includes products from the first set of products and from the second set of products, further wherein the filtered list of products includes an aggregated total for products purchased from the first set of products without identifying every product identifier for products purchased from the first set of products;

further wherein the filtered list of products separately lists every product identifier for products purchased from the second set of products;

d) at the retail store system, transmitting the filtered list of products being purchased to the server system;

e) at the server system, calculating an aggregated discount for the first set of products reported in the filtered list of products, and separately calculating a discount for each product in the second set of products reported in the filtered list of products;

f) at the server system, transmitting the calculated aggregated discount and the separately calculated discounts to the retail store system; and g) at the point of sale terminal at the retail store system, applying the aggregated discount and the separately calculated discounts to the single purchase transaction.

2. The method of claim 1, wherein the first list of promoted products has, for each product, a product identifier field to contain the product identifier and a group identifier field to contain the group identifier.

3. The method of claim 2, wherein the second set of products have an empty group identifier field.

4. The method of 1, wherein the filtered list of products being purchased has an aggregated quantity purchased value for all products purchased from the first set of products and a separate quantity purchased value for every product identifier in the second set of products.

5. The method of 4, wherein the filtered list of products being purchased has an aggregated monetary purchase amount for all products purchased from the first set of products and a separate monetary purchase amount for every product identifier in the second set of products.

6. The method of 5, wherein the filtered list of products being purchased has an aggregated discount-applied-at-retailer amount for all products purchased from the first set of products and a separate discount-applied-at-retailer amount for every product identifier in the second set of products; further wherein the server system adjusts the calculated aggregated discount based on the aggregated discount-applied-at-retailer amount; and further wherein the server system adjusts the separately calculated discounts based on the separate discount-applied-at-retailer amounts.

7. The method of claim 1, further comprising:

h) at the server system, changing the product identifiers associated with the common group identifier from the first set of products to a third set of products by transmitting a second list of promoted products to the retail store system, wherein not all products in the first set of products have product identifiers associated with the common group identifier in the second list of promoted products;

wherein a third set of products have product identifiers that are associated with the common group identifier, and i) at the server system, receiving from the retail store system after transmitting the second list of promoted products, a new filtered list of products being purchased in a second transaction at the retail store system based on filtering against the second list of promoted products.

\* \* \* \* \*